US010795957B2

United States Patent
Xu

(10) Patent No.: US 10,795,957 B2
(45) Date of Patent: Oct. 6, 2020

(54) INFORMATION RECOMMENDING METHOD AND DEVICE

(71) Applicant: Beijing Sankuai Online Technology Co., Ltd, Beijing (CN)

(72) Inventor: Jiangyi Xu, Beijing (CN)

(73) Assignee: Beijing Sankuai Online Technology Co., Ltd., Beijing (CN)

(*) Notice: Subject to any disclaimer, the term of this patent is extended or adjusted under 35 U.S.C. 154(b) by 0 days.

(21) Appl. No.: 16/622,295

(22) PCT Filed: Dec. 29, 2017

(86) PCT No.: PCT/CN2017/119939
§ 371 (c)(1),
(2) Date: Dec. 13, 2019

(87) PCT Pub. No.: WO2019/000887
PCT Pub. Date: Jan. 3, 2019

(65) Prior Publication Data
US 2020/0104333 A1    Apr. 2, 2020

(30) Foreign Application Priority Data

Jun. 26, 2017 (CN) .......................... 2017 1 0496441

(51) Int. Cl.
*H04W 4/021* (2018.01)
*G06F 16/9535* (2019.01)
(Continued)

(52) U.S. Cl.
CPC .......... *G06F 16/9535* (2019.01); *G06F 16/29* (2019.01); *G06F 16/9537* (2019.01); *H04W 4/021* (2013.01)

(58) Field of Classification Search
CPC .. G06F 16/9535; G06F 16/9537; G06F 16/29; H04W 4/021
See application file for complete search history.

(56) References Cited

U.S. PATENT DOCUMENTS 8,335,524 B2 * 12/2012 Shutter .................. G06Q 30/02
455/456.3
10,417,691 B2 * 9/2019 Agarwal ............... H04W 4/029
(Continued)

FOREIGN PATENT DOCUMENTS

CN    102685662 A    9/2012
CN    103279470 A    9/2013
(Continued)

OTHER PUBLICATIONS

ISA State Intellectual Property Office of the People's Republic of China, International Search Report Issued in Application No. PCT/CN2017/119939, dated Apr. 4, 2018, WIPO, 4 pages.
(Continued)

*Primary Examiner* — Julio R Perez
(74) *Attorney, Agent, or Firm* — Kilpatrick Townsend & Stockton, LLP

(57) ABSTRACT

Provided are an information recommending method and an information recommending device. According to an embodiment, the method specifically includes: obtaining a current time and a current geographical region in which a user is located; and recommending POI information of the current geographical region to the user if the current time is within an active time range of the user and the current geographical region is an unfamiliar region of the user. In the embodiment, not only the POI information can be accurately distributed, but also a waste of network resources and disturbance to the user resulting from recommendation of irrelevant POI information can be reduced.

9 Claims, 10 Drawing Sheets

(51) Int. Cl.
*G06F 16/9537* (2019.01)
*G06F 16/29* (2019.01)

(56) References Cited

U.S. PATENT DOCUMENTS

| | | | | |
|---|---|---|---|---|
| 2009/0271105 | A1* | 10/2009 | Kindo | G01C 21/3407 |
| | | | | 701/439 |
| 2013/0006515 | A1* | 1/2013 | Vellaikal | H04W 4/021 |
| | | | | 701/410 |
| 2013/0006904 | A1 | 1/2013 | Horvitz et al. | |
| 2015/0148076 | A1* | 5/2015 | Lin | G06F 16/9537 |
| | | | | 455/456.3 |
| 2015/0234873 | A1 | 8/2015 | Laurenzo et al. | |
| 2015/0332325 | A1* | 11/2015 | Sharma | H04W 4/029 |
| | | | | 705/14.57 |
| 2016/0379293 | A1 | 12/2016 | Barajas Gonzalez et al. | |

FOREIGN PATENT DOCUMENTS

| | | |
|---|---|---|
| CN | 103905978 A | 7/2014 |
| CN | 104008184 A | 8/2014 |
| CN | 104102638 A | 10/2014 |
| CN | 104484817 A | 4/2015 |
| CN | 104636354 A | 5/2015 |
| CN | 105450594 A | 3/2016 |
| CN | 105488233 A | 4/2016 |
| CN | 105490926 A | 4/2016 |
| CN | 106484848 A | 3/2017 |
| CN | 106528559 A | 3/2017 |

OTHER PUBLICATIONS

State Intellectual Property Office of the People's Republic of China, Office Action and Search Report Issued in Application No. 201710496441.9, dated Jun. 18, 2019, 13 pages,(Submitted with Machine Translation).

Kong Yangxin et al, "Population flow analysis based on cellphone trajectory data" Journal of Computer Applications, issn.1001-9081 Jan. 10, 2016. 01, 8 pages.

State Intellectual Property Office of the People's Republic of China, Notice of Rejection of decision Issued in Application No. 2017104964419, dated Mar. 24, 2020, 14 pages. (Submitted with Partial Translation).

CN Second Office Action with written opinion dated Dec. 6, 2019 in the corresponding CN application (application No. 201710496441.9).

European Patent Office, Extended European Search Report Issued in Application No. 17915769.8, dated Jun. 18, 2020, Germany, 8 pages.

Gallego Daniel et al.,"Evaluating the impact of proactivity in the user experience of a context-aware restaurant recommender for Android smartphones", Journal of Systems Architecture, Oct. 31, 2013, 12 pages.

\* cited by examiner

INFORMATION RECOMMENDING METHOD AND DEVICE

CROSS-REFERENCE TO RELATED APPLICATIONS

This application is a U.S. National Stage of International Application No. PCT/CN2017/119939, filed on Dec. 29, 2017, designating the United States, which claims the priority to the Chinese Patent Application No. 201710496441.9, entitled "INFORMATION RECOMMENDING METHOD AND DEVICE", filed on Jun. 26, 2017, the content of each of which is incorporated by reference in its entirety.

TECHNICAL FIELD

This application relates to the field of geographical information technologies, and in particular, to a method and an information recommending device.

BACKGROUND

A Point of Interest (POI) is a term in a geographical information system, and refer to a geographical object that may be abstracted to a point, especially some geographical entities closely related to people's lives, such as a school, a band, a restaurant, a gas station, a hospital, and a supermarket.

With the rapid development of mobile terminals and communications technologies, when a user uses an APP (application) in a mobile terminal, the APP in the mobile terminal may obtain a current location of the user and recommend POIs, such as a restaurant, a gas station, and a supermarket, near the current location to the user, which beings great convenience to the life of user.

In an existing POI recommendation method, recommendation is usually performed based on a geographical location of a user. However, when the user is at a relatively familiar region, such as near a work unit or home, and the user has been very familiar to nearby POIs, or when the user has no consuming intention, if POIs are recommended to the user, not only a waste of network resources in a POI information transmission process is caused, but also unnecessary interference is brought to the user.

SUMMARY

In view of the foregoing problem, this application provides an information recommending method and an information recommending device to overcome or at least partially resolve the foregoing problem.

According to an aspect of this application, an information recommending method is provided, including:
obtaining a current time and a current geographical region in which a user is located; and
recommending POI information of the current geographical region to the user if the current time is within an active time range of the user and the current geographical region is an unfamiliar region of the user.

Optionally, the active time range of the user is determined by using the following steps:
obtaining historical access logs of the user within a preset time period and extracting access time points corresponding to the historical access logs;
clustering the extracted access time points, to obtain a time point set meeting a first density condition, where the first density condition includes: the time point set includes access time points whose quantity exceeds a first threshold, and a time interval between every two access time points in the time point set is less than a preset interval; and
counting the access time points in the time point set, to determine the active time range of the user.

Optionally, the unfamiliar region of the user is determined by using the following steps:
obtaining historical access logs of the user within a preset time period and determining location tracks corresponding to the historical access logs;
clustering track points in the determined location tracks according to longitudes and latitudes, to obtain a track point set meeting a second density condition, where the second density condition includes: track points whose quantity exceeds a second threshold exist in preset coverage centered by any track point in the track point set; and
determining the unfamiliar region of the user according to longitudes and latitudes of the track points in the track point set.

Optionally, the method further includes:
collecting historical access logs of the user, where the historical access logs include at least a user identifier, an access time, and a location track corresponding to a user access behavior;
uploading the historical access logs of the user to a server, so that the server determines the active time range and the unfamiliar region of the user according to the historical access logs; and
obtaining the active time range and the unfamiliar region of the user from the server.

Optionally, the method further includes:
obtaining duration of stay of the user in the current geographical region if the current time is within the active time range of the user and the current geographical region is the unfamiliar region of the user; and recommending the POI information of the current geographical region to the user if the duration of stay exceeds a preset time threshold.

According to another aspect of this application, an information recommending device is provided, including:
a first obtaining module, configured to obtain a current time and a current geographical region in which a user is located; and
a first recommendation module, configured to recommend POI information of the current geographical region to the user if the current time is within an active time range of the user and the current geographical region is an unfamiliar region of the user.

Optionally, the device further includes:
an active time range determining module, configured to determine the active time range of the user, where
the active time range determining module includes:
a first obtaining submodule, configured to obtain historical access logs of the user within a preset time period and extract access time points corresponding to the historical access logs;
a first clustering submodule, configured to cluster the extracted access time points, to obtain a time point set meeting a first density condition, where the first density condition includes: the time point set includes access time points whose quantity exceeds a first threshold, and a time interval between every two access time points in the time point set is less than a preset interval; and a first counting submodule, configured to count the access time points in the time point set, to determine the active time range of the user.

Optionally, the device further includes:

an unfamiliar region determining module, configured to determine the unfamiliar region of the user, where the unfamiliar region determining module includes:

a second obtaining submodule, configured to obtain historical access logs of the user within a preset time period and determine location tracks corresponding to the historical access logs.

a second clustering submodule, configured to cluster track points in the determined location tracks according to longitudes and latitudes, to obtain a track point set meeting a second density condition, where the second density condition includes: track points whose quantity exceeds a second threshold exist in preset coverage centered by any track point in the track point set; and a second counting submodule, configured to determine the unfamiliar region of the user according to longitudes and latitudes of the track points in the track point set.

Optionally, the device further includes:

a collection module, configured to collect historical access logs of the user, where the historical access logs include at least a user identifier, an access time, and location tracks corresponding to a user access behavior; and an uploading module, configured to upload the historical access logs of the user to a server, so that the server determines the active time range and the unfamiliar region of the user according to the historical access logs; and a second obtaining module, configured to obtain the active time range and the unfamiliar region of the user from the server.

Optionally, the device further includes:

a second recommendation module, configured to obtain duration of stay of the user in the current geographical region if the current time is within the active time range of the user and the current geographical region is the unfamiliar region of the user; and recommend the POI information of the current geographical region to the user if the duration of stay exceeds a preset time threshold.

According to another aspect of this application, a computing device is provided, including: a memory, a processor, and a program stored in the memory and executable by the processor, where when executing the program, the processor implements the steps of the foregoing information recommending method.

According to another aspect of this application, a computer readable storage medium storing a program is provided, where when executing the program, a processor implements the steps of the foregoing information recommending method.

According to an information recommending method and an information recommending device provided in the embodiments of this application, on the basis of recommending POI information based on a geographical location of a user in the existing technology, whether the user has a demand of POI information is further determined according to an obtained current time, and a current geographical region in which the user is located. Specifically, if the current time is within an active time range of the user and the current geographical region is an unfamiliar region of the user, it may be regarded that the user has a demand of POI information. In this case, POI information of the current geographical region is recommended to the user, so that not only the POI information can be distributed accurately, but also a waste of network resources and disturbance to the user resulting from recommendation of irrelevant POI information can be reduced.

The foregoing description is merely an overview of the technical solutions of this application. To understand the technical means of this application more clearly to implement the technical means according to the content of this specification, and to make the foregoing and other objectives, features, and advantages of this application clearer and more understandable, specific implementations of this application are used below.

BRIEF DESCRIPTION OF THE DRAWINGS

Optional implementations are described in detail below with reference to the accompanying drawings, and various other advantages and benefits of the present disclosure become clear to a person of ordinary skill in the art. The accompanying drawings are merely used for showing the objectives of the optional implementations, but are not regarded as a limitation to this application. Moreover, in the entire accompanying drawings, the same reference symbols are used for representing the same components. In the accompanying figures.

DETAILED DESCRIPTION OF THE EMBODIMENTS

The exemplary embodiments of this disclosure are described below in more detail with reference to the accompanying drawings. Although the exemplary embodiments of this disclosure are displayed in the accompanying drawings, it should be understood that, this disclosure may be implemented in various forms but should not be limited by the embodiments described herein. On the contrary, by providing these embodiments, this disclosure can be understood more thoroughly, and the scope of this disclosure can be completely conveyed to a person skilled in the art.

In the existing solution, when a user accesses an application (APP) in a mobile terminal, the accessed APP may obtain a current location of the user, and recommend POI information near the current location to the user. For example, if the user accesses a food APP, the food APP may recommend restaurants away from 500 meters to the current location to the user. However, whether the user needs the POI information currently is not considered in the existing solution, leading to transmission of unnecessary POI information, causing a waste of network resources, and interference on the user.

To reduce the waste of network resources and the interference on the user caused by transmission of unnecessary POI information, in the embodiments of this application, a current time and a current geographical region in which the user is located are determined, and if the current time is within an active time range of the user and the current geographical region is an unfamiliar region of the user, it may be regarded that the user has a demand of POI information. In this case, POI information of the current geographical region is recommended to the user, so that not only the POI information can be distributed accurately, but also the waste of network resources and the disturbance to the user resulting from recommendation of irrelevant POI information can be reduced.

Figure 1:
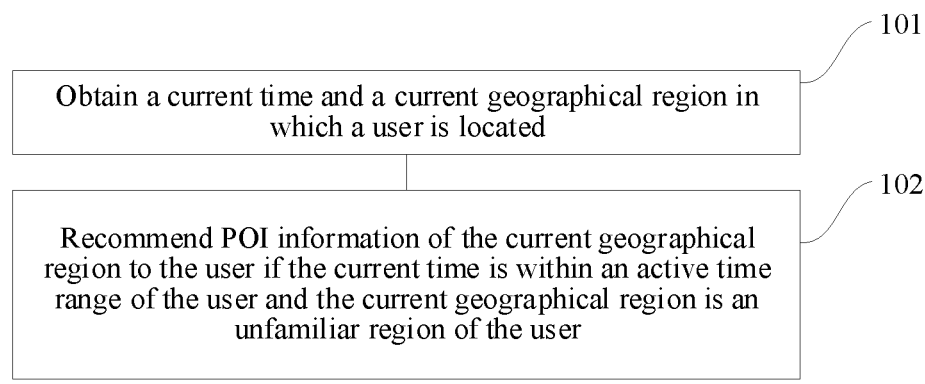
FIG. 1 shows a flowchart of steps of an information recommending method according to an embodiment of this application.

FIG. 1 shows a flowchart of steps of an information recommending method according to an embodiment of this application. The method may specifically include the following steps:

Step 101. Obtain a current time and a current geographical region in which a user is located.

Step 102. Recommend POI information of the current geographical region to the user if the current time is within an active time range of the user and the current geographical region is an unfamiliar region of the user.

This embodiment of this application is applicable to a mobile terminal, to intelligently recommend the POI information to the user by using the mobile terminal. Therefore, network resources of the mobile terminal can be saved, and use experience of the user for the mobile terminal can be improved. The mobile terminal may be specifically any mobile terminal such as a smartphone, a tablet computer, or a notebook computer. The specific mobile terminal is not limited in this embodiment of this application. For ease of description, in this embodiment of this application, a smartphone is used as an example to describe the information recommending method, and mutual reference may be made to information recommending method corresponding to other mobile terminals.

In this embodiment of this application, the active time range may be used for reflecting a high-frequency time period of a user access behavior. For example, if the current time obtained by the food APP is within the active time range of the user, it may be regarded that the user has a tendency to search for a nearby restaurant in the food APP, that is, the user has a demand of POI information, the food APP may recommend the POI information to the user. The recommended POI information may include: restaurant information near the current geographical region in which the user is located.

In this embodiment of this application, the unfamiliar region may be used for reflecting a low-frequency geographical region in which the user appears. If the user is in the unfamiliar region, it indicates that the user is not familiar enough to POI information in the region, and the POI information may be recommended to the user.

In this embodiment of this application, whether the user has the demand of the POI information at the current time and in the current geographical region may be determined based on the active time range of the user and the unfamiliar region of the user, so that not only the POI information can be recommended accurately, but also a waste of network resources and interference on the user can be reduced.

In actual application, when a user accesses an APP such as a food APP in a mobile terminal, the accessed APP may record corresponding access information to an access log, where the access information may specifically include: access time, location information (information such as a longitude and latitude and a street address), a source APP, or a uniform resource locator (URL) address of a page. Therefore, in this embodiment of this application, historical access logs of the user within a preset time period may be pre-collected, and the collected historical access logs may be analyzed, to obtain an active time range of the user and an unfamiliar region of the user.

In this embodiment of this application, the historical access logs may be not only from one APP (such as a food APP) in the mobile terminal, but also from a plurality of APPs (such as a food APP, a navigation APP, and a shopping APP) in the mobile terminal. Alternatively, the historical access logs may be from one or more APPs in a plurality of mobile terminals of the user. For example, if the user logs in to the APP in a plurality of mobile terminals by using the user account, in this embodiment of this application, the historical access logs recorded by the APP in the plurality of mobile terminals of the user may be collected by using the user account. It may be understood that, the specific collection manner of the historical access logs of the user within the preset time period is not limited in this embodiment of this application. The preset time period may be a recent period of time, for example, the last month, the last three months, or the last six months. It may be understood that, the duration of the preset time period is not limited in this embodiment of this application.

Figure 2:
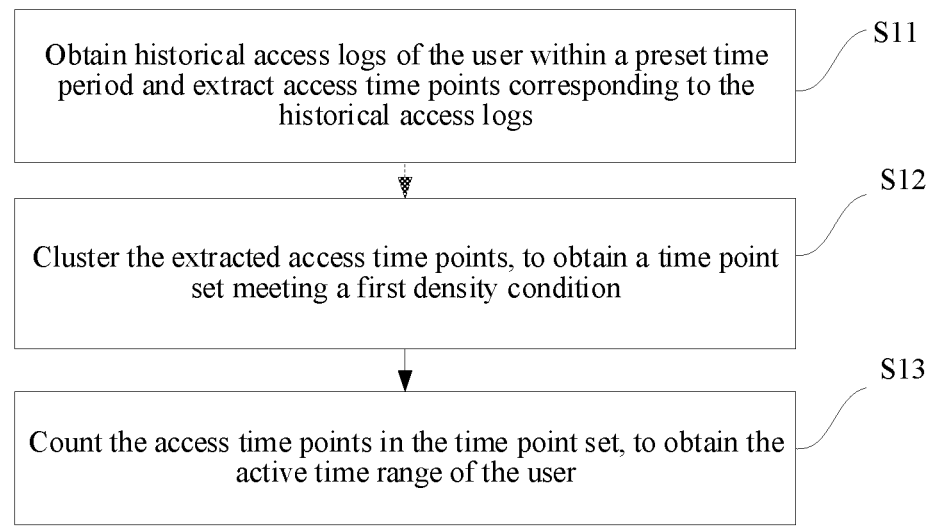
FIG. 2 shows a flowchart of a step for determining an active time range of a user according to an embodiment of this application.

As shown in FIG. 2, in an optional embodiment of this application, the active time range of the user may be determined by using the following steps.

Step S11. Obtain historical access logs of the user within a preset time period and extract access time points corresponding to the historical access logs.

The historical access logs may include an access log generated by any access behavior performed by the user by using the mobile terminal, for example: an access log generated by any access behavior, for example, the user accesses an APP, or clicks a merchant list or a merchant page, or invokes a positioning service to position a location of the mobile terminal, or generates a reservation or a transaction on a merchant page. It may be understood that, the specific content of the historical access logs is not limited in this embodiment of this application.

Specifically, the APP in the mobile terminal may obtain all historical access logs of the user in the last month, and screen out historical access logs with access time from all the historical access logs.

Step S12. Cluster the extracted access time points, to obtain a time point set meeting a first density condition, where the first density condition may include: the time point set includes access time points whose quantity exceeds a first threshold, and a time interval between every two access time points in the time point set is less than a preset interval.

Optionally, in this embodiment of this application, DBScan (Density-Based Spatial Clustering of Applications with Noise) is used to cluster the access time points. The algorithm uses a density-based clustering concept to require the quantity of objects (points or other spatial objects) in a region in a clustering space to be not less than a given threshold. It may be understood that, the specific clustering algorithm is not limited in this embodiment of this application. For example, an OPTICS (Object Points To Identify The Clustering Structure) clustering algorithm or a DENCLUE (density distribution function) clustering algorithm may also be used.

For example, assuming that the preset interval is 30 seconds, and the first threshold is 4, in the clustered time point set meeting the first density condition, access time points exist in a time interval of 30 seconds and the quantity of access time points in the time interval of 30 seconds is greater than or equal to 4. Therefore, the obtained time point set includes a high-frequency time point of the user access behavior, and the high-frequency time point may reflect an active time of the user access behavior.

Step S13. Count the access time points in the time point set, to obtain the active time range of the user.

Specifically, in this embodiment of this application, the access time points in the time point set may be counted, to obtain an average value through calculation. For example, if an average value obtained through calculation according to the access time points in the time point set is 12:00 on Sunday, because in actual application, the access time of the user is usually not fixed at a specific time point, in this embodiment of this application, on the basis of the average value, the time period is fluctuated to obtain an active time range more corresponding to reality. For example, most of the access time points in the time point set are distributed from 11:20 to 13:30 on Sunday, it may be determined that the active time range of the user is 11:00 to 13:00 on Sunday according to the average value, and the active time range may reflect the high-frequency time period of the user access behavior. If the current time is within the active time range of the user, it may be regarded that the user has a demand of POI information at the current time.

It may be understood that, the fluctuated time period may be determined according to the distribution of the access time point, or may be determined according to actual life experience, which is not limited in this embodiment of this application. For example, for the food APP, the user usually has an access demand in a time range of a lunch (11:00 to 13:00) or a super (17:00 to 19:00).

In this embodiment of this application, when the average value of the access time points in the time point set is calculated, the calculation may be performed according to all access time points in the time point set, or the average value may be calculated by removing the maximum value and the minimum value, to avoid impact of individual extreme points on the average value, thereby improving accuracy of the active time range. It may be understood that, the specific manner for calculating the average value of the access time points in the time point set is not limited in this embodiment of this application. Certainly, counting the access time points in the time point set by calculating the average value, and determining the active time range of the user is merely used as an application instance of this application. The specific manner for counting the access time points in the time point set is not limited in this embodiment of this application. For example, the access time points in the time point set may also be counted by using a standard deviation manner.

In this embodiment of this application, when the user accesses the APP in the mobile terminal, the APP may collect historical access logs of the user, and analyze the historical access logs of the user, to obtain the unfamiliar region of the user. For example, the unfamiliar region may be a region in addition to familiar regions, and the familiar regions may include: a work region, a living region, and the like. If the current geographical region in which the user is located is the unfamiliar region of the user, it indicates that the user is not familiar enough to POIs in the region. Therefore, it may be regarded that the user has a demand of POI information at the current time.

Figure 3:
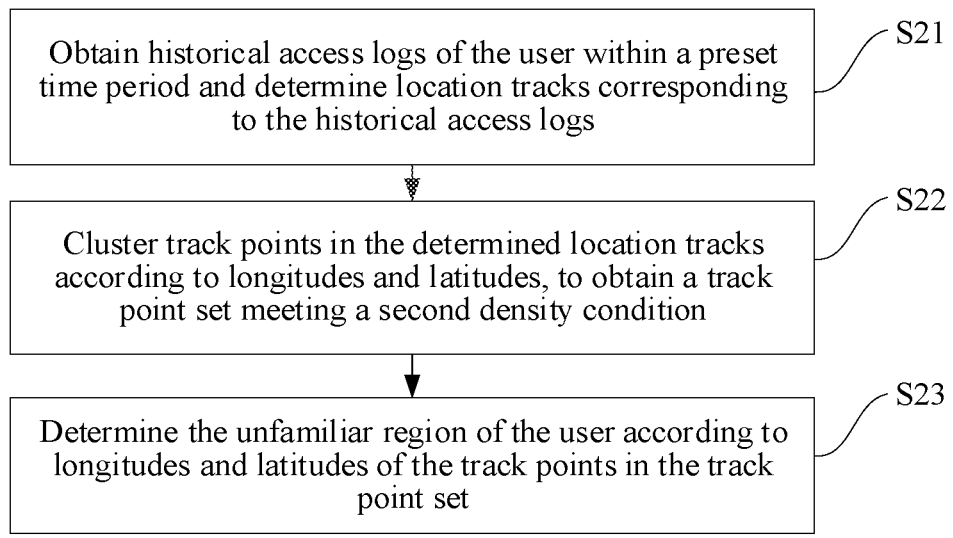
FIG. 3 shows a flowchart of a step for determining an unfamiliar region of a user according to an embodiment of this application.

As shown in FIG. 3, in an optional embodiment of this application, the unfamiliar region of the user may be determined by using the following steps.

Step S21. Obtain historical access logs of the user within a preset time period and determine location tracks corresponding to the historical access logs.

The historical access logs may include an access log generated by any access behavior performed by the user by using the mobile terminal, for example: an access log generated by any access behavior, for example, the user accesses an APP, or clicks a merchant list or a merchant page, or invokes a positioning service to position a location of the mobile terminal, or generates a reservation or a transaction on a merchant page. It may be understood that, the specific content of the historical access logs is not limited in this embodiment of this application.

Specifically, the APP in the mobile terminal may obtain all historical access logs of the user in the last month, and screen out historical access logs with longitude and latitude information from all the historical access logs. For example, if access information recorded in a historical access log includes longitude and latitude information, and the longitude and latitude information is: (34.2294710000, 108.9538400000), it may be determined according to the longitude and latitude information that the corresponding location is a "SEG shopping center", that is, the user has once appeared in the "SEG shopping center". According to all historical access logs with longitude and latitude information of the user in the last month, location tracks of the user corresponding to the historical access logs may be obtained.

Step S22. Cluster track points in the determined location tracks according to longitudes and latitudes, to obtain a track point set meeting a second density condition, where the second density condition may include: track points whose quantity exceeds a second threshold exist in a preset coverage centered by any track point in the track point set.

Same as the access time point clustering manner, the track points are clustered by using the DBScan clustering algorithm in this embodiment of this application. For example, assuming that the preset coverage is round coverage with the center of any track point in the track point set and the radius of 500 meters, and the second threshold is 50, in the clustered track point set meeting a second density condition, track points exist in the round coverage with the center of any track point and the radius of 500 meters, and the quantity of track points is greater than or equal to 50. Therefore, the obtained track point set includes a high-frequency location point of the user appearing in the location tracks of the user, used for reflecting a geographical location in which the user often appears. It may be understood that, the form of the preset coverage is not limited in this application. For example, the preset coverage may also be a rectangular region.

Step S23. Determine the unfamiliar region of the user according to longitudes and latitudes of the track points in the track point set.

Specifically, in this embodiment of this application, longitudes and latitudes of the track points in the track point set may be counted, to obtain an average value through calculation, and familiar regions of the user may be obtained according to the distribution of the track points in the track point set, and in combination with life common sense. The unfamiliar region of the user may be a region in addition to the familiar regions of the user. The specific counting process and manner are similar to the counting process of the access time point, which is not described herein again.

Optionally, to make the determined unfamiliar region more suitable for an actual life habit of the user, in this embodiment of this application, in addition to the historical access logs of the user within the preset time period, and the location tracks corresponding to the historical access logs, an access time corresponding to the historical access logs may be further obtained. Assuming that most of the track points in the clustered track point set are distributed from 9:00 to 19:00, and it may be known according to life common sense that, this period of time is usually working hours of the user, it may be determined that the track point set is a working region of the user. If most of the track points in the track point set are distributed from 19:00 to 8:00, it may be determined that the track point set is a living region of the user.

In conclusion, in this embodiment of this application, on the basis of recommending POI information based on a geographical location of a user in the existing technology, whether the user has a demand of POI information is further determined according to a current time, and a current geographical region in which the user is located. Specifically, if the current time is within an active time range of the user and the current geographical region is an unfamiliar region of the user, it may be regarded that the user has a demand of POI information. In this case, POI information of the current geographical region is recommended to the user, so that not only the POI information can be distributed accurately, but also a waste of network resources and disturbance to the user resulting from recommendation of irrelevant POI information can be reduced.

Figure 4:
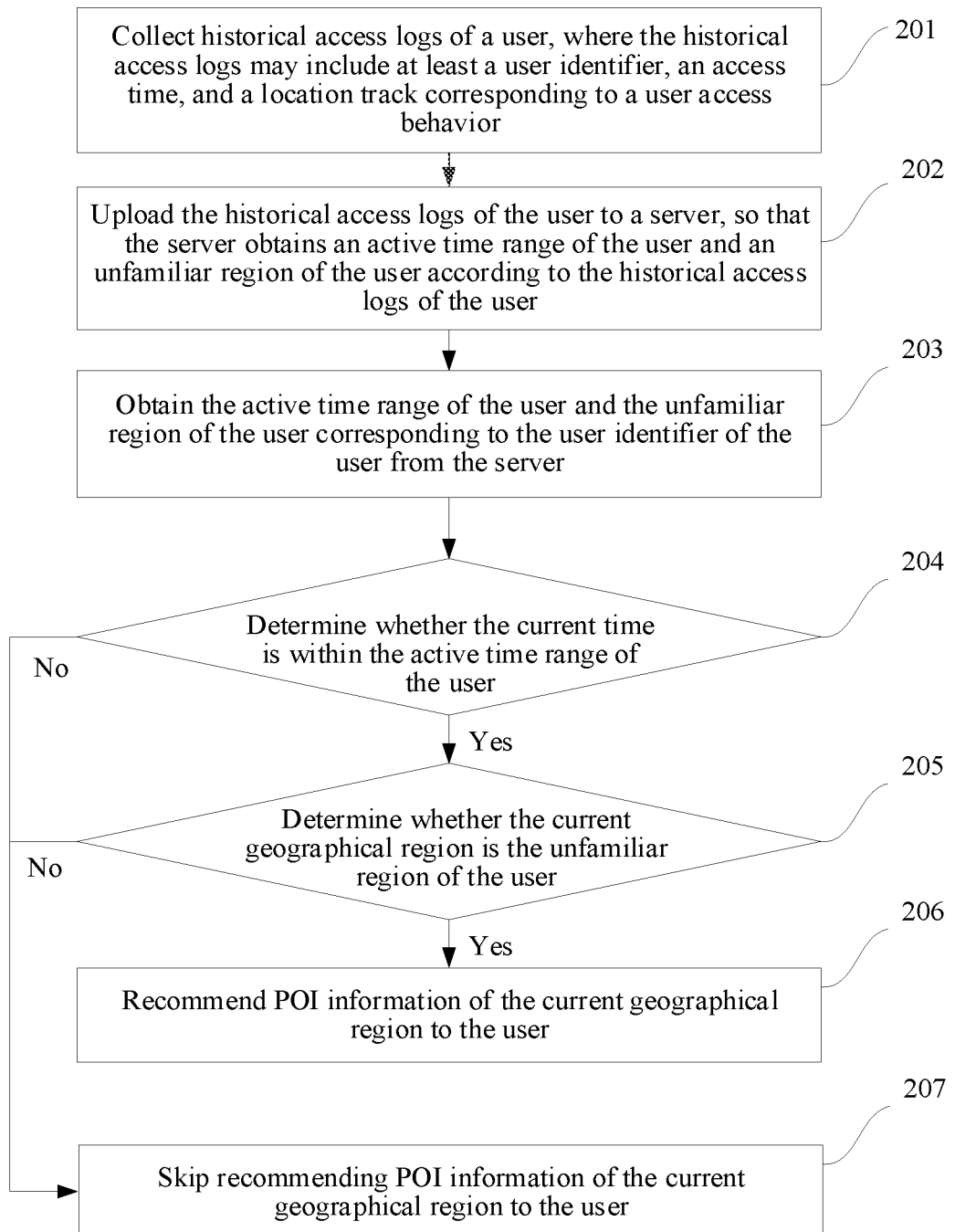
FIG. 4 shows a flowchart of steps of an information recommending method according to another embodiment of this application.

In this embodiment of this application, the historical access logs of the user may be collected by using the mobile terminal, and the historical access logs may be analyzed, to obtain the active time range of the user and the unfamiliar region of the user. Optionally, to save the storage space of the mobile terminal and lighten the calculation burden of the mobile terminal, in this embodiment of this application, the historical access logs of the user collected by the mobile terminal may be uploaded to a server, and the server analyzes the historical access logs of the user. FIG. 4 shows a flowchart of steps of an information recommending method according to another embodiment of this application. The method may specifically include the following steps.

Step 201. Collect historical access logs of a user, where the historical access logs may include at least a user identifier, an access time, and a location track corresponding to a user access behavior.

In specific application, when the user accesses an APP in a mobile terminal, the APP in the mobile terminal may record an access log of the user, and store the recorded access log locally to the mobile terminal. The user identifier may be identification information such as a device identifier corresponding to the mobile terminal of the user, or a user account of the user. The specific content of the user identifier is not limited in this embodiment of this application.

Step 202. Upload the historical access logs of the user to a server, so that the server obtains an active time range of the user and an unfamiliar region of the user according to the historical access logs of the user.

Specifically, the mobile terminal may upload the locally stored historical access logs of the user to the server regularly in batches, and the historical access logs may include at least: a user identifier, an access time, and a location track corresponding to a user access behavior.

The server organizes the historical access logs of the user uploaded by the mobile terminal, filters out wrong data in the historical access logs, and stores the filtered historical access logs in the server, to continuously accumulate the historical access logs of the user. The server analyzes the historical access logs of the user within a preset time range, and obtains the active time range of the user and the unfamiliar region of the user through calculation by using a clustering algorithm, and establishes a mapping relationship between the user identifier of the user and the active time range of the user as well as the unfamiliar region of the user in the server.

Step 203. Obtain the active time range of the user and the unfamiliar region of the user corresponding to the user identifier of the user from the server.

Specifically, the APP in the mobile terminal may obtain the current time, and the current geographical region in which the user is located, and obtain the active time range of the user and the unfamiliar region of the user corresponding to the user identifier of the user from the server.

Step 204. Determine whether the current time is within the active time range of the user, if the current time is within the active time range, perform step 205, and otherwise, perform step 207.

Step 205. Determine whether the current geographical region is the unfamiliar region of the user, if the current geographical region is the unfamiliar region of the user, perform step 206, and otherwise, perform step 207.

Step 206. Recommend POI information of the current geographical region to the user.

Step 207. Skip recommending POI information of the current geographical region to the user.

It should be noted that, the execution sequence of step 204 and step 205 is not limited in this embodiment of this application. Step 204 and step 205 may be performed sequentially, conversely, or simultaneously.

In an application instance of this application, when a user accesses a food APP in a smartphone, the food APP may obtain a current time and a current geographical region in which the user is located. In addition, the food APP may further send a device identifier of the smartphone of the user to a food commenting server, to request an active time range and a familiar region of the user from the food commenting server. After receiving the request of the food APP, the food commenting server returns the active time range and the familiar region corresponding to the device identifier of the smartphone of the user. If determining that the current time is within the active time range of the user and the current geographical region is the unfamiliar region of the user, the food APP recommends restaurant information of the current geographical region to the user.

In conclusion, in this embodiment of this application, historical access logs of a user collected by a mobile terminal are uploaded to a server, so that the server analyzes the historical access logs of the user, to obtain an active time range of the user and an unfamiliar region of the user, to accurately distribute POI information. Moreover, on the basis of reducing a waste of network resources and disturbance to the user resulting from recommendation of irrelevant POI information, the storage space of the mobile terminal can be saved and the calculation burden of the mobile terminal can be lightened. In addition, the historical access logs of the user are clustered by using a big data-based clustering and analysis algorithm in this embodiment of this application, to ensure accuracy of a clustering result.

Figure 5:
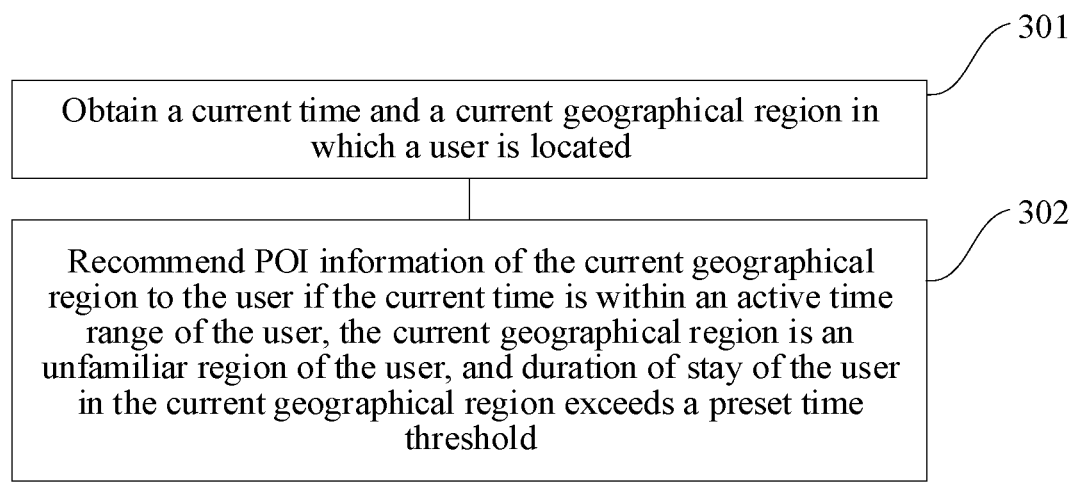
FIG. 5 shows a flowchart of steps of an information recommending method according to still another embodiment of this application.

FIG. 5 shows a flowchart of steps of an information recommending method according to an embodiment of this application. The method may specifically include the following steps:

Step 301. Obtain a current time and a current geographical region in which a user is located.

Step 302. Recommend POI information of the current geographical region to the user if the current time is within an active time range of the user, the current geographical region is an unfamiliar region of the user, and duration of stay of the user in the current geographical region exceeds a preset time threshold.

In addition to according to the active time range of the user and familiar regions of the user, whether to recommend the POI information to the user may be further determined according to the duration of stay of the user in the current geographical region in this embodiment of this application. The duration of stay may be used for reflecting an access tendency of the user. For example, if the duration of stay of the user in a shopping mall exceeds 30 minutes, it may be regarded that the user has a tendency to consume in the shopping mall, and merchant information in the shopping mall may be recommended to the user. If the duration of stay of the user in the shopping mall is only 5 minutes, it may be regarded that the user has no tendency to consume in the shopping mall, and merchant information in the shopping mall may not be recommended to the user.

It should be noted that the method embodiments are expressed as a series of action combinations for the purpose of brief description, but a person of ordinary skills in the art should know that because some steps may be performed in other sequences or simultaneously according to the embodiments of this application, the embodiments of this application are not limited to a described action sequence. In addition, a person skilled in the art should also know that the embodiments described in this specification are all preferred embodiments; and therefore, an action involved is not necessarily mandatory in the embodiments of this application.

Figure 6:
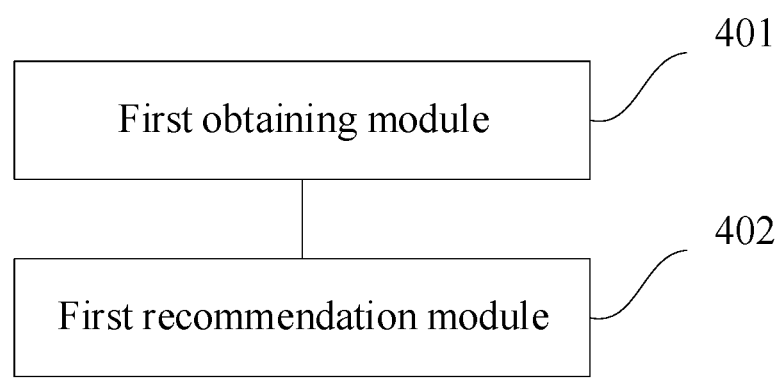
FIG. 6 shows a structural block diagram of an information recommending device according to an embodiment of this application.

FIG. 6 shows a structural block diagram of an information recommending device according to an embodiment of this application. The device may specifically include the following modules:

a first obtaining module 401, configured to obtain a current time and a current geographical region in which a user is located; and a first recommendation module 402, configured to recommend POI information of the current geographical region to the user if the current time is within an active time range of the user and the current geographical region is an unfamiliar region of the user.

Figure 7:
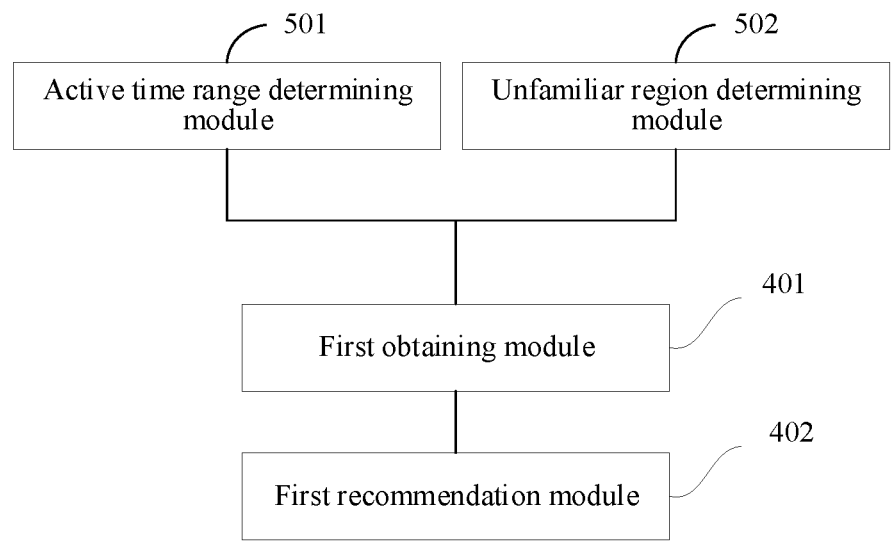
FIG. 7 shows a structural block diagram of another information recommending device according to another embodiment of this application.

Optionally, as shown in FIG. 7, the device may further include:

an active time range determining module 501, configured to determine an active time range of the user, where the active time range determining module 501 may specifically include:

a first obtaining submodule 5011, configured to obtain historical access logs of the user within a preset time period and extract access time points corresponding to the historical access logs;

a first clustering submodule 5012, configured to cluster the extracted access time points, to obtain a time point set meeting a first density condition, where the first density condition includes: the time point set includes access time points whose quantity exceeds a first threshold, and a time interval between every two access time points in the time point set is less than a preset interval; and a first counting submodule 5013, configured to count the access time points in the time point set, to determine the active time range of the user.

Optionally, the device may further include:

an unfamiliar region determining module 502, configured to determine an unfamiliar region of the user, where the unfamiliar region determining module 502 may specifically include:

a second obtaining submodule 5021, configured to obtain historical access logs of the user within a preset time period and determine location tracks corresponding to the historical access logs.

a second clustering submodule 5022, configured to cluster track points in the determined location tracks according to longitudes and latitudes, to obtain a track point set meeting a second density condition, where the second density condition includes: track points whose quantity exceeds a second threshold exist in preset coverage centered by any track point in the track point set; and a second counting submodule 5023, configured to determine the unfamiliar region of the user according to longitudes and latitudes of the track points in the track point set.

Figure 8:
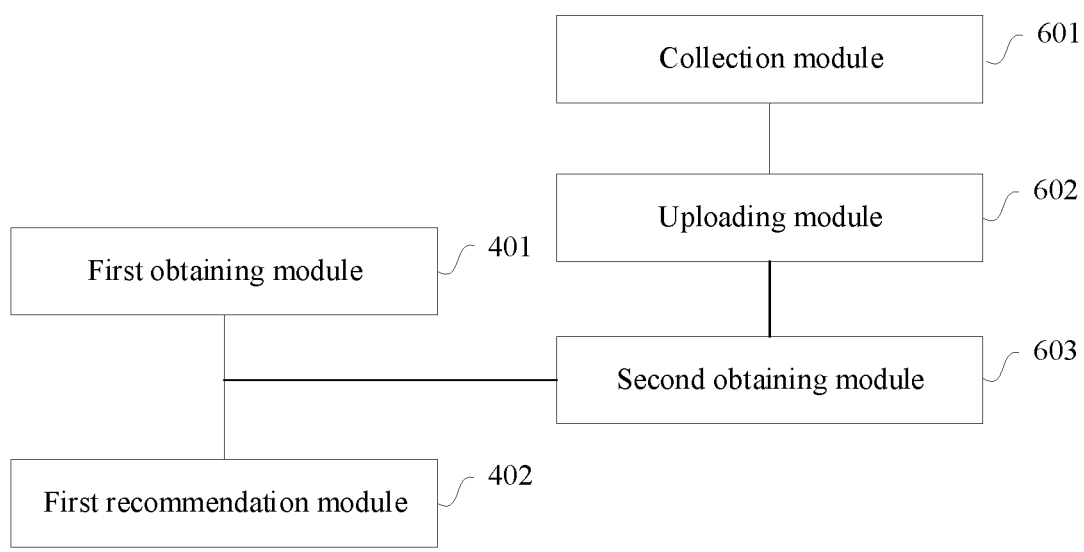
FIG. 8 shows a structural block diagram of an information recommending device according to still another embodiment of this application.

Optionally, as shown in FIG. 8, the device may further include:

a collection module 601, configured to collect historical access logs of the user, where the historical access logs include at least a user identifier, an access time, and a location track corresponding to a user access behavior;

an uploading module 602, configured to upload the historical access logs of the user to a server, so that the server determines the active time range and the unfamiliar region of the user according to the historical access logs; and a second obtaining module 603, configured to obtain the active time range and the unfamiliar region of the user from the server.

Figure 9:
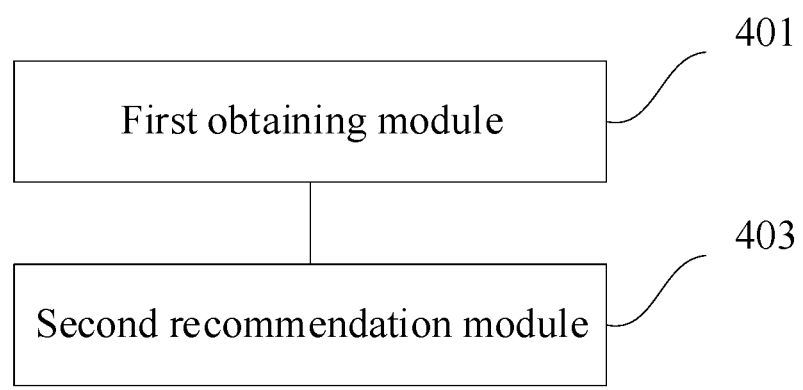
FIG. 9 shows a structural block diagram of an information recommending device according to yet another embodiment of this application.

FIG. 9 shows a structural block diagram of an information recommending device according to an embodiment of this application. The device may specifically include the following modules:

a first obtaining module 401, configured to obtain a current time and a current geographical region in which a user is located; and a second recommendation module 403, configured to obtain duration of stay of the user in the current geographical region if the current time is within an active time range of the user and the current geographical region is an unfamiliar region of the user; and recommend POI information of the current geographical region to the user if the duration of stay exceeds a preset time threshold.

The device embodiments shown in FIG. 6 to FIG. 9 are substantially similar to the method embodiments shown in FIG. 1 to FIG. 5 and therefore are only briefly described, and reference may be made to the method embodiments shown in FIG. 1 to FIG. 5 for the associated part.

An embodiment of this application provides a computing device, including: a memory, a processor, and a program stored in the memory and executable by the processor, where when executing the program, the processor implements the steps of the information recommending method shown in FIG. 1 to FIG. 5.

Figure 10:
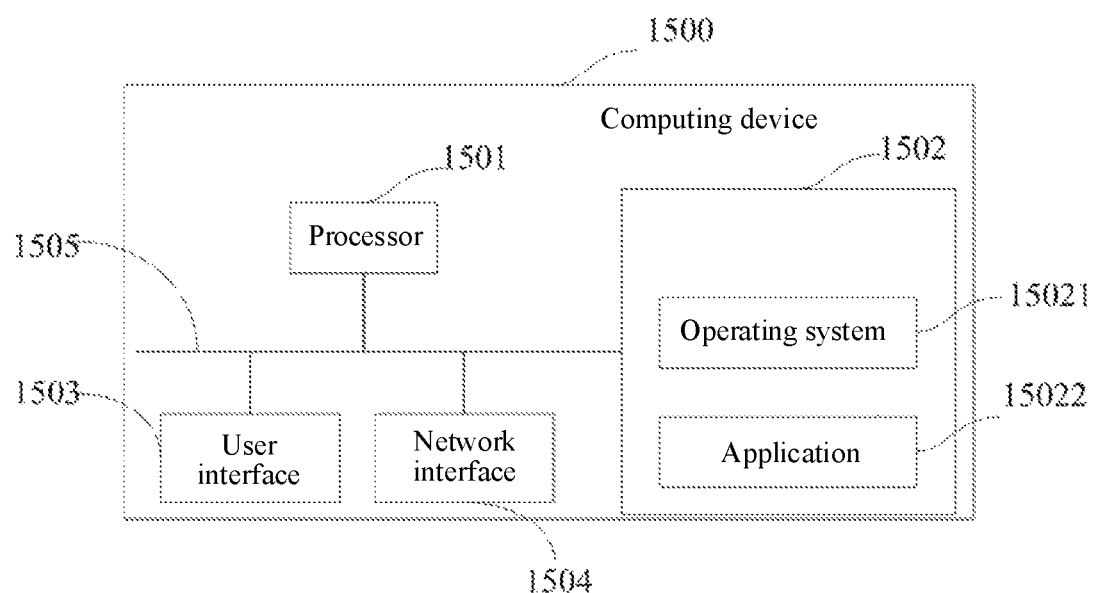
FIG. 10 shows a schematic structural diagram of a computing device 1500 according to this application.

FIG. 10 shows a schematic structural diagram of a computing device 1500 according to this application. The computing device 1500 may specifically include: at least one processor 1501, a memory 1502, at least one network interface 1504, and a user interface 1503. The components in the computing device 1500 are coupled by using a bus system 1505. It may be understood that, the bus system 1505 is configured to implement connection and communication between the components. In addition to a data bus, the bus system 1505 further includes a power bus, a control bus, and a state signal bus. But, for ease of clear description, all types of buses in FIG. 10 are marked as the bus system 1505.

The user interface 1503 may include a display, a keyboard or a clicking device (for example, a mouse), a track ball, a touch panel or a touch screen, and the like.

It may be understood that, the memory 1502 in this embodiment of this application may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct Rambus RAM (DRRAM), are available. The memory 1502 in the system and method described in this embodiment of this application includes, but is not limited to these memories and any other suitable types.

In some implementations, the memory 1502 stores the following element, an executable module, or a data structure, or a subset thereof, or an extension set thereof: an operating system 15021 and an application 15022.

The operating system 15021 includes various system programs, for example, a frame layer, a core library layer, and a drive layer, used for implementing various basic services and processing tasks based on hardware. The application 15022 includes various APPs, for example, a media player and a browser, used for implementing various application services. A program for implementing the method of the embodiments of this application may be included in the application 15022.

In this embodiment of this application, by invoking a program or an instruction stored in the memory 1502, which may be specifically a program or an instruction stored in the application 15022, the processor 1501 is configured to obtain a current time and a current geographical region in which a user is located; and recommend POI information of the current geographical region to the user if the current time is within an active time range of the user and the current geographical region is an unfamiliar region of the user.

A computer readable storage medium storing a program is provided. When executing the program, a processor implements the steps of the information recommending method shown in FIG. 1 to FIG. 5.

The methods disclosed in the embodiments of this application may be applied to the processor 1501, or may be implemented by the processor 1501. The processor 1501 may be an integrated circuit chip and has a signal processing capability. In an implementation process, the steps in the foregoing methods can be implemented by using a hardware integrated logical circuit in the processor 1501, or by using instructions in a form of software. The processor 1501 may be a general-purpose processor, a digital signal processor (DSP), an application specific integrated circuit (ASIC), a field programmable gate array (FPGA), or another programmable logic device (PLD), discrete gate, or transistor logic device, or discrete hardware assembly, to implement or perform the methods, steps, and logic block diagrams disclosed in the embodiments of this application. The general-purpose processor may be a microprocessor or any conventional processor or the like. Steps of the methods disclosed with reference to the embodiments of this application may be directly performed and completed by using a hardware decoding processor, or may be performed and completed by using a combination of hardware and a software module in the decoding processor. The software module may be located in a mature storage medium in the art, such as a RAM, a flash memory, a ROM, a programmable ROM, an electrically erasable programmable memory, or a register. The storage medium is located in the memory 1502, and the processor 1501 reads information in the memory 1502 and completes the steps in the foregoing methods in combination with hardware of the processor.

It may be understood that, these embodiments described in the embodiments of this application may be implemented by using hardware, software, firmware, middleware, microcode, or a combination thereof. For hardware implementation, the processing unit may be implemented in one or more application specific integrated circuits (ASICs), a DSP, a DSP Device (DSPD), a PLD, an FPGA, a general-purpose processor, a controller, a microcontroller, a microprocessor, another electronic unit configured to perform the function of this application, or a combination thereof.

For software implementation, the technology in the embodiments of this application may be implemented by performing a module (for example, a process or a function) of the function in the embodiments of this application. Software code may be stored in the memory and executed by the processor. The memory may be implemented inside the processor or outside the processor.

Optionally, the processor 1501 is further configured to determine the active time range of the user by using the following steps:

obtaining historical access logs of the user within a preset time period and extracting access time points corresponding to the historical access logs;

clustering the access time points, to obtain a time point set meeting a first density condition, where the first density condition includes: time intervals between the access time points in the time point set are less than a preset interval; and the quantity of the access time points in the time point set exceeds a first threshold; and counting the access time points in the time point set, to obtain the active time range of the user.

Optionally, the processor 1501 is further configured to determine the unfamiliar region of the user by using the following steps:

obtaining historical access logs of the user within a preset time period and location tracks corresponding to the historical access logs;

clustering track points in the location tracks according to longitudes and latitudes, to obtain a track point set meeting a second density condition, where the second density condition includes: track points whose quantity exceeds a second threshold exist in preset coverage centered by any track point in the track point set; and obtaining the unfamiliar region of the user according to longitudes and latitudes of the track points in the track point set.

Optionally, the processor 1501 is further configured to collect historical access logs of the user, where the historical access logs include at least a user identifier, an access time, and a location track corresponding to a user access behavior; upload the historical access logs of the user to a server, so that the server obtains the active time range of the user and the unfamiliar region of the user according to the historical access logs of the user; and obtain the active time range of the user and the unfamiliar region of the user corresponding to the user identifier of the user from the server.

Optionally, the processor 1501 is further configured to recommend POI information of the current geographical region to the user if the current time is within the active time range of the user, the current geographical region is the unfamiliar region of the user, and duration of stay of the user in the current geographical region exceeds a preset time threshold.

An embodiment of this application further provides a computer readable storage medium storing a program, where when executing the program, a processor performs the following steps: obtaining a current time and a current geographical region in which a user is located; and recommending POI information of the current geographical region to the user if the current time is within an active time range of the user and the current geographical region is an unfamiliar region of the user.

The algorithm and display provided herein are not inherently related to any particular computer, a virtual system, or other devices. Various general-purpose systems may also be used together based on the demonstration herein. According to the foregoing description, structures required to construct the types of systems are obvious. In addition, this application is also not directed at any particular programming language. It should be understood that, various programming languages may be used to implement the content of this application described herein, and the foregoing description for a particular language is for disclosing the optimal implementation of this application.

In this specification provided herein, a lot of specific details are described. However, it can be understood that, the embodiments of this application may be implemented without these specific details. In some instances, the well-known methods, structures, and technologies are not shown in detail, to avoid obscuring the understanding for this specification.

Similarly, it should be understood that, to simplify this disclosure and help understand one or more of the invention aspects, in the foregoing description for the exemplary embodiments of this application, features of this application are sometimes grouped together to a single embodiment or figure, or description for the features. However, the disclosed method should not be explained to reflect the following intention: this application required to be protected requires more features than features recorded clearly in each claim. More specifically, as reflected by the following claims, the invention aspects are less than all features of the single embodiments disclosed above. Therefore, the claims following the specific implementations are clearly combined into the specific implementations, where each claim itself is used as a single embodiment of this application.

A person skilled in the art may understand that, modules in a device in an embodiment may be adaptively changed and disposed in one or more devices different from those in the embodiment. The modules or units or components in the embodiments may be combined into one module or unit or component, or may be divided into a plurality of submodules or subunits or subcomponents. In addition to at least some mutually exclusive ones in such features and/or processes or units, any combination may be used to combine all features disclosed in this specification (including the appended claims, abstract, and accompanying drawings) and all processes or units of any method or device in this disclosure. Unless otherwise explicitly stated, each feature disclosed in this specification (including the appended claims, abstract, and accompanying drawings) may be replaced with an alternative feature providing the same, equivalent, or similar objective.

In addition, a person skilled in the art can understood that, although some embodiments described herein include some features included in other embodiments instead of other features, combinations of features of different embodiments mean that the combinations are within the scope of this application and form different embodiments. For example, in the following claims, any one of the embodiments required to be protected may be used in any combination manner.

Component embodiments of this application may be implemented by hardware, or implemented by a software module running in one or more processors, or implemented by a combination thereof. A person skilled in the art should understand that, in practice, a microprocessor or a DSP may be used to implement some or all functions of some of all components in the information recommending method and device according to the embodiments of this application. This application may be further implemented as some or all devices or apparatus programs (for example, programs and program products) used for performing the method described herein. Such programs for implementing this application may be stored in a computer readable medium, or may have the form of one or more signals. Such signals may be downloaded from an Internet platform, or provided on carrier signals, or provided in any other form.

It should be noted that, this application is described in the foregoing embodiments instead of being limited, and a person skilled in the art may design alternative embodiments without departing from the scope of the appended claims. In the claims, any reference symbols between parentheses should not be constructed as a limitation to the claims. The word "include" does not exclude the existence of elements or steps not listed in the claims. The word "a" or "one" before the elements does not exclude the existence of a plurality of such elements. This application may be implemented by means of hardware including several different elements and by means of a suitably programmed computer. In the unit claims in which several apparatuses are listed, the several apparatuses may be specifically embodied by using the same hardware item. The use of the words such as first, second, and third does not represent any sequence. These words may be explained as names.

The invention claimed is:

1. An information recommending method, comprising:
obtaining, by a computing system, a current time and a current geographical region in which a user is located;
obtaining, by the computing system, historical access logs of the user within a preset time period;
extracting, by the computing system, access time points corresponding to historical access logs;
clustering, by the computing system, the extracted access time points, to obtain a time point set meeting a first density condition, wherein the first density condition comprises
the time point set comprising access time points whose quantity exceeds a first threshold, and a time interval between every two access time points in the time point set is less than a preset interval;

counting, by the computing system, the access time points in the time point set, to determine an active time range of the user;

determining, by the computing system, location tracks corresponding to the historical access logs;

clustering, by the computing system, track points in the determined location tracks according to longitudes and latitudes, to obtain a track point set meeting a second density condition, wherein the second density condition comprises: track points whose quantity exceeds a second threshold exist in preset coverage centered by any track point in the track point set; and determining, by the computing system, an unfamiliar region of the user according to the longitudes and latitudes of the track points in the track point set; and recommending, by the computing system, point of interest (POI) information of the current geographical region to the user when the current time is within the active time range of the user and the current geographical region is the unfamiliar region of the user.

2. The method according to claim 1, further comprising:

collecting, by the computing system, the historical access logs of the user, wherein the historical access logs comprise at least a user identifier, an access time, and a location track corresponding to a user access behavior;

uploading, by the computing system, the historical access logs of the user to a server to facilitate the server to determine the active time range and the unfamiliar region of the user according to the historical access logs; and obtaining the active time range and the unfamiliar region of the user from the server.

3. The method according to claim 1, wherein recommending, by a computing system, POI information of the current geographical region to the user when the current time is within the active time range of the user and the current geographical region is the unfamiliar region of the user comprises:

obtaining, by the computing system, duration of stay of the user in the current geographical region when the current time is within the active time range of the user and the current geographical region is the unfamiliar region of the user; and recommending, by the computing system, the POI information of the current geographical region to the user when the duration of stay exceeds a preset time threshold.

4. A computing device, comprising:

a memory, a processor, and a program stored in the memory and executable by the processor, wherein when executing the program, the processor implements the program comprising:

obtaining a current time and a current geographical region in which a user is located;

obtaining historical access logs of the user within a preset time period;

extracting access time points corresponding to historical access logs;

clustering the extracted access time points, to obtain a time point set meeting a first density condition, wherein the first density condition comprises the time point set comprising access time points whose quantity exceeds a first threshold, and a time interval between every two access time points in the time point set is less than a preset interval;

counting the access time points in the time point set, to determine an active time range of the user;

determining location tracks corresponding to historical access logs;

clustering track points in the determined location tracks according to longitudes and latitudes, to obtain a track point set meeting a second density condition, wherein the second density condition comprises: track points whose quantity exceeds a second threshold exist in preset coverage centered by any track point in the track point set;

determining an unfamiliar region of the user according to the longitudes and latitudes of the track points in the track point set; and recommending point of interest (POI) information of the current geographical region to the user when the current time is within the active time range of the user and the current geographical region is the unfamiliar region of the user.

5. The computing device according to claim 4, further comprise:

collecting the historical access logs of the user, wherein the historical access logs comprise at least a user identifier, an access time, and a location track corresponding to a user access behavior;

uploading the historical access logs of the user to a server to facilitate the server to determine the active time range and the unfamiliar region of the user according to the historical access logs; and obtaining the active time range and the unfamiliar region of the user from the server.

6. The computing device according to claim 4, wherein recommending POI information of the current geographical region to the user when the current time is within the active time range of the user and the current geographical region is the unfamiliar region of the user comprises:

obtaining duration of stay of the user in the current geographical region when the current time is within the active time range of the user and the current geographical region is the unfamiliar region of the user; and recommending the POI information of the current geographical region to the user when the duration of stay exceeds a preset time threshold.

7. A non-transitory computer readable storage medium storing a program, wherein when executing the program, a processor implements the program comprising:

obtaining a current time and a current geographical region in which a user is located;

obtaining historical access logs of the user within a preset time period;

extracting access time points corresponding to historical access logs;

clustering the extracted access time points, to obtain a time point set meeting a first density condition, wherein the first density condition comprises:

the time point set comprising access time points whose quantity exceeds a first threshold, and a time interval between every two access time points in the time point set is less than a preset interval;

counting the access time points in the time point set, to determine an active time range of the user;

determining location tracks corresponding to the historical access logs;

clustering track points in the determined location tracks according to longitudes and latitudes, to obtain a track point set meeting a second density condition, wherein the second density condition comprises: track points whose quantity exceeds a second threshold exist in preset coverage centered by any track point in the track point set;

determining an unfamiliar region of the user according to the longitudes and latitudes of the track points in the track point set; and recommending point of interest (POI) information of the current geographical region to the user when the current time is within the active time range of the user and the current geographical region is the unfamiliar region of the user.

8. The non-transitory computer readable storage medium according to claim 7, further comprises:

collecting the historical access logs of the user, wherein the historical access logs comprise at least a user identifier, an access time, and a location track corresponding to a user access behavior;

uploading the historical access logs of the user to a server to facilitate the server to determine the active time range and the unfamiliar region of the user according to the historical access logs; and obtaining the active time range and the unfamiliar region of the user from the server.

9. The non-transitory computer readable storage medium according to claim 7, wherein recommending POI information of the current geographical region to the user when the current time is within the active time range of the user and the current geographical region is the unfamiliar region of the user comprises:

obtaining duration of stay of the user in the current geographical region when the current time is within the active time range of the user and the current geographical region is the unfamiliar region of the user; and recommending the POI information of the current geographical region to the user when the duration of stay exceeds a preset time threshold.

\* \* \* \* \*